United States Patent [19]

Dahm et al.

[11] 4,107,102

[45] Aug. 15, 1978

[54] HIGHLY ELASTIC POLYURETHANE FOAMS AND PROCESS FOR MAKING THEM

[75] Inventors: Manfred Dahm, Bergisch Neukirchen; Manfred Jautelat, Burscheid-Hilgen, both of Fed. Rep. of Germany

[73] Assignee: Bayer Aktiengesellschaft, Leverkusen, Fed. Rep. of Germany

[21] Appl. No.: 796,797

[22] Filed: May 13, 1977

Related U.S. Application Data

[63] Continuation of Ser. No. 646,466, Jan. 5, 1976, abandoned, which is a continuation of Ser. No. 455,706, Mar. 28, 1974, abandoned.

[51] Int. Cl.$^2$ .................. C08G 18/14; C08G 18/32
[52] U.S. Cl. .................. 521/163; 521/51; 521/176
[58] Field of Search .............. 260/77.5 AM, 2.5 AM, 260/2.5 AT, 77.5 AT

[56] References Cited

U.S. PATENT DOCUMENTS

| | | | |
|---|---|---|---|
| 2,834,748 | 5/1958 | Bailey et al. | 260/825 |
| 2,957,852 | 10/1960 | Frankenburg et al. | 260/2.5 AM |
| 3,316,285 | 4/1967 | Cleveland | 260/77.5 AT |

FOREIGN PATENT DOCUMENTS

| | | | |
|---|---|---|---|
| 1,499,901 | 11/1967 | France | 260/2.5 |
| 2,110,055 | 9/1972 | Fed. Rep. of Germany | 260/2.5 |
| 1,090,589 | 11/1967 | United Kingdom | 260/2.5 |
| 1,360,131 | 7/1974 | United Kingdom | 260/2.5 |

OTHER PUBLICATIONS

Saunders et al., *Polyurethane*, Part II, Interscience, NY, 1964, pp. 120-124.

*Primary Examiner*—M. J. Welsh
*Attorney, Agent, or Firm*—Gene Harsh; Joseph C. Gil; William E. Parry

[57] ABSTRACT

An elastic polyurethane foam having a density, sag factor, tensile strength and elongation at break which adapt it for use in upholstery is prepared by reacting a poly(alkylene ether) polyol having at least about 10% by weight of primary hydroxyl groups and hydrazine or a hydrazine adduct with an organic polyisocyanate which contains at least about 50% by weight of distilled tolylene diisocyanate.

6 Claims, No Drawings

HIGHLY ELASTIC POLYURETHANE FOAMS AND PROCESS FOR MAKING THEM

This application is a continuation of our copending application Ser. No. 646,466 filed Jan. 5, 1976 now abandoned, which itself is a continuation of application Ser. No. 455,706 filed Mar. 28, 1974, and now abandoned.

This invention relates generally to synthetic resinous cellular products or foams and more particularly to an improved polyurethane foam for use in upholstery.

Synthetic resinous foams having a wide variety of physical properties have been produced on a commercial scale by the isocyanate polyaddition process wherein an organic compound which contains several active hydrogen atoms, such as, for example, an organic compound which contains hydroxyl and/or carboxyl groups is reacted with an organic polyisocyanate. If desired, water, activators, emulsifiers, foam stabilizers and other additives may be included in the reaction mixture (see R. Vieweg, A. Hochtlen, Kunststoff-Handbuch, Volume VII, Polyurethane, Carl-Hanser-Verlag, Munich 1966).

With a suitable choice of the components it is possible by this process to obtain either elastic or rigid foams of various degrees of elasticity or rigidity.

Soft elastic polyurethane forms have been widely used in the upholstery industry for the production of upholstery for seats and backrests. These materials must provide seating comfort which is comparable to that of foams produced from natural latex. Physically, the quality of the upholstery element can be defined by the compression factory, also known in American literature as the sag factor (i.e. the quotient of the hardness number at 65% indentation and 25% indentation obtained in tests in which the whole deformation is kept constant for one minute) and the shape of the force/deformation curves. To obtain good padding properties, the sag factor should have a value of above 2.5 and the force/deformation curves should not have a plateau, i.e. a slight change in the force applied should only produce a slight change in the deformation. Attempts have already been made to improve the sag factor of polyurethane foams by adding inert fillers such as barium sulphate or calcium carbonates to the foamable reaction mixture, but this method has serious disadvantages because the addition of the fillers is very difficult and moreover impairs the other properties of the foam.

A foam used in the upholstery industry should also be very strong so that it will not tear when subjected to mechanical stress, such as, for example, when it is covered with textiles.

A soft elastic foam particularly suitable for upholstery purposes should therefore have a sag factor above about 2.5 and the force/deformation curve should not have a plateau, i.e. only slight changes in deformation should occur in response to changes in force, and moreover, the tensile strength and elongation at break should be as high as possible.

In German Offenlegungsschrift No. 2,110,055 it has been proposed to produce highly elastic polyurethane foams by reacting organic polyisocyanates with poly(alkylene ether) polyols and low molecular weight cross-linking or chain lengthening agents such as aliphatic, cycloaliphatic, or aromatic glycols or amino glycols which contain OH groups or OH and NH groups and aliphatic, cycloaliphatic or aromatic amines in the presence of blowing agents, catalysts and optionally other additives but virtually without foam stabilizers of the polyether-polysiloxane type.

This process has, however, many disadvantages. It is restricted to the production of foams with a limited range of densities. Although foams with high densities can be produced by this process, it is impossible or at least very difficult to obtain foams with densities below 30 kg./m$^3$ (<2 pounds/cu.ft.) by this process. This is a serious economical disadvantage to the manufacturer because foams are usually sold by volume so that a given volume should weigh as little as possible.

Other disadvantages of highly elastic foams previously produced are their low tensile strength and elongation at break and the fact that more than 1% by weight and in most cases more than 3% by weight of low molecular weight cross-linking or chain lengthening agents must be used to produce stable foams. Apart from the technical difficulties of mixing such large quantities of low molecular weight compounds with the other components, there is the economic disadvantage that these large quantities of cross-linking agents necessitate the use of corresponding large quantities of organic polyisocyanates. It is therefore desired to develop compounds which are highly effective as cross-linking or chain lengthening agents so much so that they need only be used in small quantities.

It is therefore an object of this invention to provide an improved process for making polurethane foams suitable for use in upholstery. Another object of the invention is to provide a soft elastic polyurethane foam having a sag factor, a force/deformation curve, elongation at break and tensile strength which render it suitable for use in upholstery. Still another object of the invention is to provide a commercially practical process for making a polyurethane foam of low density having physical characteristics which enable it to be used to advantage in upholstery.

The foregoing objects and others are accomplished in accordance with this invention, generally speaking, by providing a polyurethane foam prepared by reacting an organic polyisocyanate containing at least 50% by weight of distilled tolylene diisocyanate and a poly(alkylene ether) polyol having a molecular weight of at least about 1500 in which at least 10% by weight of the terminal hydroxyl group are primary hydroxyl groups and hydrazine or an adduct of hydrazine in a reaction mixture which contains a blowing agent.

It has now been found surprising that the foregoing disadvantages can be overcome if instead of aliphatic, cycloaliphatic or aromatic glycols or amino glycols which contain OH groups or OH and NH groups and aliphatic, cycloaliphatic, or aromatic amines, special hydrazine derivatives and/or hydrazine adducts are used as low molecular weight cross-linking and chain lengthening agents.

This invention therefore provides a process for the production of highly elastic polyurethane foams wherein an organic polyisocyanate is reacted with a poly(alkylene ether) polyol, which contains at least two hydroxyl groups has a molecular weight of at least about 1500 and preferably between about 1500 and about 10,000 and a chain lengthening or cross-linking agent in the presence of a blowing agent and optionally catalysts and other additives, which process is characterized in that the polyisocyanate used is distilled tolylene diisocyanate, the hydroxyl groups of the poly(alkylene ether) polyol are at least 10% by weight primary hydroxyl groups and the chain lengthening or cross-linking agents are hydrazine derivatives and/or hydrazine adducts of the general formula R — NH — NH — R' . (H$_2$O)$_n$, in which R and R' may be the same or different and represent hydrogen or alkyl, cycloalkyl, aryl, aralkyl or acyl groups and $n = 0$ or 1, the reaction being carried out in the absence of foam stabilizers of the polyether-polysiloxane type. In the above formula, R and R' are preferably $C_1$–$C_{12}$ alkyl groups, $C_5$–$C_{14}$ cycloalkyl groups, $C_6$–$C_{14}$ aryl groups, $C_7$–$C_{20}$ aralkyl groups or $C_1$–$C_{12}$ acyl groups.

It is most prefered, that R and R' are $C_1$–$C_6$ alkyl groups, $C_5$–$C_{10}$ cycloalkyl groups, $C_6$–$C_{10}$ aryl groups, $C_7$–$C_{10}$ aralkyl groups or $C_1$–$C_8$ acyl groups. If R and R' are alkyl or cycloalkyl groups, these groups can optionally be substituted by cyano or amino groups; if R and R' are aryl or aralkyl groups, these groups can optionally be substituted by halogen atoms, preferably chlorine atoms, or nitro groups.

The disadvantages of the highly elastic polyurethane foams previously produced are overcome by using these cross-linking or chain lengthening agents. It is now possible to produce foams within a wide range of densities, i.e. with densities between about 50 kg/m$^3$ and 18 kg/m$^3$. The foams obtained have very good physical properties as regards their tensile strength and elongation at break.

The polyisocyanate used includes distilled tolylene diisocyanate. The commercial isomeric mixtures consisting essentially, e.g. of 80% by weight of 2,4-isomer and 20% by weight of 2,6-isomer or 65% by weight of 2,4-isomer and 35% by weight of 2,6-isomer may be used to advantage but it may also be advantageous to use substantially pure tolylene-2,4-diisocyanate or tolylene-2,6-diisocyanate or mixtures of these with commercial isomeric mixtures. The tolylene diisocyanate isomers may advantageously also be used as a mixture with other aromatic isocyanates such as 4,4'-diphenylmethane diisocyanate or m-phenylene diisocyanate or other known aliphatic or cycloaliphatic diisocyanates such as hexamethylene-1,6-diisocyanate or hexahydrophenylene-1,3-diisocyanate, but these other aromatic isocyanates should only be used in quantities of less than 50% by weight of the total quantity of isocyanates.

By using mixtures of isocyanates it is possible to adjust the activity of the isocyanate as required to the activity of the whole foamable reaction mixture.

The low molecular weight hydrazine derivatives and/or hydrazine adducts are preferably used in a quantity of between about 0.1 and about 0.8 part by weight, based on the hydrazine group, per 100 parts by weight of poly(alkylene ether) polyol. Those compounds may either be added directly to the foamable mixture or they may first be mixed with water or some other component of the formulation and then added to the remainder of the reaction mixture.

Any suitable hydrazine compound of the foregoing formula may be used, such as, for example: hydrazine, hydrazine hydrate, methylhydrazine, ethyl hydrazine, propylhydrazine, isopropylhydrazine, n-butylhydrazine, isobutylhydrazine, tert.butylhydrazine, butenylhydrazine, dodecylhydrazine, phenylhydrazine, tolylhydrazine, chlorophenylhydrazine, nitrophenylhydrazine, benzylhydrazine, 2-phenylethylhydrazine, cyclohexylhydrazine, cyclopentylhydrazine, β-cyanoethylhydrazine, 1,2-dimethylhydrazine, 1,2-diethylhydrazine, 1,2-diisobutylhydrazine, 1-butyl-2-methylhydrazine, hydrazobenzene, 1-benzyl-2-phenylhydrazine, oxalyldihydrazide, semicarbazide, carbohydrazide, 4-methylsemicarbazide, 4-phenylsemicarbazide, isophthalic acid dihydrazide, β-hydrazinopropionic acid hydrazide, thiosemicarbazide, thiocarbohydrazide, aminoguanidine, 1-aminopiperazine and 1,4-diaminopiperazine, naphththyl hydrazine, phenanthryl hydrazene, dekahydronaphthyl hydrazene, perhydrophenanthryl hydrazene, 4-bromo phenyl hydrazine, 4-iodo phenyl hydrazene, 4-fluorophenyl hydrazene.

Any suitable poly(alkylene ether) polyol which contains at least two OH groups and has a molecular weight of at least about 1500, preferably about 1500 to about 10,000 and in which at least 10% by weight of the hydroxyl groups are primary hydroxyl groups may be used as starting materials for the process according to the invention. The primary OH group content is determined by the method of Gordon Hanna and Sidney Siggia, Journal Polymer Sci. Vol. 56, pages 297 to 304 (1962). These polyethers are prepared by reacting starting compounds or initiators which contain reactive hydrogen atoms with alkylene oxides such as ethylene oxide, propylene oxide, butylene oxide, styrene oxide or epichlorohydrin or any mixtures of these alkylene oxides and if necessary subsequently modifying the resulting polyethers with ethylene oxide to provide terminal primary hydroxyl groups. Preferably, these polyethers have a functionality of between 3 and 6.

Suitable starting compounds or initiators are for example, polyhydric alcohols and phenols such as ethylene glycol, diethylene glycol, polyethylene glycol, propane-1,2-diol, propane-1,3-diol, butane-1,4-diol, hexane-1,6-diol, decane-1,10-diol, butyne-2-diol-(1,4), glycerol, butane-2,4-diol, hexane-1,3,6-triol, trimethylolpropane, resorcinol, hydroquinone, 4,6-ditertiary-butylpyrocatochol, 3-hydroxy-2-naphthol, 6,7-dihydroxy-1-naphthol, 2,5-dihydroxy-1-naphthol, 2,2-bis-(p-hydroxyphenyl)-propane, bis-(p-hydroxyphenyl)-methane and α,α,ω-tris-(hydroxyphenyl)-alkanes such as 1,1,2-tris-(hydroxyphenyl)-ethane, 1,1,3-tris-(hydroxyphenyl)-propane and the like.

The poly(alkylene ether) polyols used may also be 1,2-alkylene oxide adducts of aliphatic or aromatic monoamines or polyamines such as ammonia, methylamine, ethylene diamine N,N-dimethylethylene diamine, tetramethylene diamine, hexamethylenediamine, diethylene triamine, ethanolamine, diethanolamine, oleyldiethanolamine, methyl-diethanolamine, triethanolamine, aminoethylpiperazine, phenylene diamine, m-phenylene diamine, p-phenylene diamine, 2,4-diaminotoluene, 2,6-diamino toluene, 2,6-diamino-p-xylene and multinuclear and condensed aromatic polyamines such as naphthylene-1,4-diamine, naphthylene 1,5-diamine, benzidine, toluidine, 2,2'-dichloro-4,4'-diaminodiphenylmethane, 1-fluoroenamine, 1,4-anthradiamine, 9,10-diaminophenanthrene, 4,4'-diaminoazobenzene and the like. Resinous materials such as phenol and resol resins may also be used as starting materials.

All these polyethers are preferably synthesized with ethylene oxide as one of the reactants. The polyethers used for the process according to the invention are modified so that at least 10% by weight of all the OH groups are primary OH groups. The polyethers may also be modified by reacting them with less than an equivalent quantity of organic polyisocyanate so that they contain urethane groups. Emulsifiers and catalysts may also be used in the process according to the invention.

Any suitable emulsifiers may be used such as, e.g. addition products of ethylene oxide or of ethylene oxide and propylene oxide with hydrophobic substances which contain hydroxyl, hydroxyalkylene or hydroxyamino groups or amido groups. Any catalyst suitable for producing highly elastic foams may be used such as, for example, tertiary amines and/or silaamines, N-substituted aziridines or hexahydrotriazines, if desired in combination with organic metal compounds. The various catalysts accelerate the individual partial reactions which take place during formation of the foam to different extents. Whereas amines preferentially catalyze the foam-forming reaction, organic metal compounds preferentially act on the cross-linking reaction. The catalytic acceleration of the faom formation reaction, i.e. for example, the reaction between isocyanate groups and water with liberation of carbon black, may vary according to the constitution of the amines or silaamines used.

In order to obtain reaction times which are suitable for the foaming technique, the correct quantity of the selected catalyst or catalyst mixture is determined empirically according to its constitution. The amines used may be any of those commonly used for the production of polyurethane foams, for example, dimethylbenzylamine, N-methylmorpholine, triethylenediamine, dimethylpiperazine, 1,2-dimethylimidazole, dimethylaminoethanol, diethanolamine, triethanolamine, diethylaminoethanol, N,N,N',N'-tetramethyl-1,3-butanediamine, N-methyl-N'-dimethylamino-ethylpiperazine, pentamethyl-diethylenetriamine, N,N'-bis-(3-aminopropyl)-ethylenediamine, N,N'-bis-(2-aminopropyl)-ethylene diamine, N,N'-bis-(2-aminoethyl)-ethylenediamine and the like. The amines may be used either in their pure form or as mixtures with oxiranes such as propylene oxide, butylene oxide, styrene oxide, γ-phenoxy-propylene oxide or γ-allyloxypropylene oxide. The silaamines used may be silicon compounds which contain carbon-silicon bonds as described e.g. in German Patent Specification No. 1,229,290, which is incorporated herein by reference, and 2,2,4-trimethyl-2-silamorpholine and 1,3-diethylaminomethyltetramethyl-disiloxane are examples. Nitrogen-containing bases such as tetraalkylammonium hydroxides or alkalies, alkali metal phenolates or alcoholates such as sodium methylate may also be used. The organic metal compounds which may be used in combination with amines, silaamines and hexahydrotriazines in accordance with Belgian Patent Specification No. 730,356 the disclosure of which is incorporated herein by reference are preferably organic tin compounds, e.g. tin (II) octoate, dibutyltin dilaurate and the like.

Foaming is carried out in the presence of water and optionally additional organic blowing agents. The water is normally used in amounts of 0.5 to 15 parts by weight, preferably 1.0 to 10 parts by weight based on 100 parts by weight of the polyether. The organic blowing agents used optionally along with the water are known in the art and are e.g. monofluorotrichloro methane, difluorodichloromethane, tetrachloromethane, dichloromethane, tetrafluoroethane, acetone, cyclohexane, pentane, hexane, heptane. Generally speaking, the organic blowing agents are low boiling hydrocarbons, halogenated hydrocarbons, ketones or esters.

Additives to regulate the pore size and cell structure for example, silicone oils such as dimethylpolysiloxanes and methylphenylpolysiloxanes may also be added to the foaming mixture, the low molecular weight products being preferred. Fillers, flame retarding additives, dyes or plasticizers of known type may also be used. The term "polyether-polysiloxane" as used herein and in the claims refers to polyether-polysiloxane block copolymers of the type e.g. polyoxyethylene-oxypropylene dimethyl siloxane block copolymers as disclosed in U.S. Pat. No. 2,834,748.

The foams produced by the process according to the invention are used, for example, as upholstery materials, mattresses, packaging materials, shock absorbing motor car parts, foils for laminating purposes and insulating materials. The foam products may either be produced by foaming in the mold or they may be manufactured from materials which have been free foamed in blocks.

The process according to the invention will now be explained in more detail with the aid of the following examples.

EXAMPLES 1-13

100 parts by weight of a poly(alkylene ether) triol having a hydroxyl number of about 28 which has been obtained by an addition reaction of propylene oxide and subsequently ethylene oxide with trimethylolpropane and in which 67% by weight of the OH groups are primary OH groups and 0.5 parts by weight of hydrazine hydrate are mixed with the components shown in the table in the mixing chamber of a foaming apparatus of the kind disclosed in U.S. Pat. No. 2,764,565 and delivered on to a conveyor belt. Foam formation sets in after the starting time indicated below and is terminated after the given rising time.

| Example | 1 | 2 | 3 | 4 | 5 | 6 | 7 |
|---|---|---|---|---|---|---|---|
| Polyether | 100 | 100 | 100 | 100 | 100 | 100 | 100 |
| Water | 3.0 | 3.8 | 4.3 | 3.8 | 4.3 | 3.8 | 4.3 |
| Hydrazine Hydrate | 0.5 | 0.5 | 0.5 | 0.5 | 0.5 | 0.5 | 0.5 |
| Catalyst 1[1)] | 0.3 | 0.05 | 0.05 | — | — | — | — |
| Catalyst 2[2)] | — | — | — | 0.3 | 0.3 | — | — |
| Catalyst 3[3)] | — | — | — | — | — | 0.05 | 0.1 |
| Tin Dioctoate | 0.2 | 0.25 | 0.25 | 0.2 | 0.2 | 0.2 | 0.2 |
| Stabilizer[4)] | 1.0 | 1.0 | 1.0 | 1.0 | 1.0 | 1.0 | 1.0 |
| TDI - 80[5)] | 39.9 | 48.3 | 53.9 | 48.6 | 53.5 | 48.3 | 53.5 |
| NCO/OH Ratio | 105 | 105 | 105 | 105 | 105 | 105 | 105 |
| Starting Time (Sec.) | 5 | 8-9 | 8-9 | 7 | 7 | 9 | 7-8 |
| Rising Time (Sec.) | 50 | 93 | 85 | 95 | 90 | 120 | 90 |
| Setting Time (Sec.) | 100 | 155 | 115 | 125 | 100 | 150 | 115 |

(1) Catalyst 1: Triethylenediamine
(2) Catalyst 2:

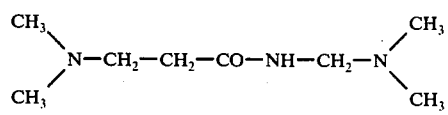

(3) Catalyst 3: Pentamethyl-diethylenetriamine

4) $C_6H_5-Si(-O-Si(CH_3)_3)_3 +$

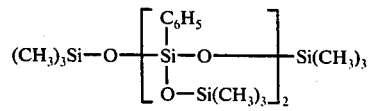

(5) 80:20 mixture of tolylene-2,4- and -2,6-diisocyanate (% by weight)

| Example | 8 | 9 | 10 | 11 | 12 | 13 |
|---|---|---|---|---|---|---|
| Polyether | 100 | 100 | 100 | 100 | 100 | 100 |
| Water | 3.8 | 4.3 | 3.8 | 4.3 | 3.8 | 4.3 |
| Hydrazine Hydrate | 0.5 | 0.5 | 0.5 | 0.5 | 0.5 | 0.5 |
| Catalyst 4[6] | 0.1 | 0.15 | — | — | — | — |
| Catalyst 5[7] | — | — | 0.1 | 0.1 | — | — |
| Catalyst 6[8] | — | — | — | — | 0.1 | 0.1 |
| Tin Dioctoate | 0.2 | 0.2 | 0.2 | 0.2 | 0.2 | 0.2 |
| Stabilizer [4] | 1.0 | 1.0 | 1.0 | 1.0 | 1.0 | 1.0 |
| TDI -80[5] | 48.3 | 53.5 | 48.3 | 53.5 | 48.3 | 53.5 |
| NCO/OH Ratio | 105 | 105 | 105 | 105 | 105 | 105 |
| Starting Time (Sec.) | 8 | 8 | 8–9 | 8 | 8 | 7 |
| Rising Time (Sec.) | 88 | 85 | 98 | 95 | 90 | 87 |
| Setting Time (Sec.) | 110 | 105 | 125 | 115 | 120 | 105 |

[6]Catalyst 4: 5 parts of dimethylsilamorpholine, 35 parts of diethylaminoethanol and 60 parts of N-methyl-N'-dimethylaminoethyl-piperazine
[7]Catalyst 5: N-methyl-N'-dimethylaminoethyl-piperazine
[8]Catalyst 6: $\beta,\beta'$-bis-dimethylamino-diethylether.

| Example | 1 | 2 | 3 | 4 | 5 | 6 | 7 |
|---|---|---|---|---|---|---|---|
| Density (kg/m$^3$) | 29 | 25 | 22 | 25 | 21 | 24 | 21 |
| Tensile Strength (kg.wt./cm$^2$) | 1.4 | 1.5 | 1.4 | 1.3 | 1.2 | 1.3 | 1.3 |
| Elongation at Break (%) | 300 | 285 | 305 | 340 | 330 | 300 | 290 |
| Compression Strength 40% (P/cm$^2$) | 18 | 26 | 25 | 17 | 18 | 21 | 23 |
| Sag Factor | 2.9 | 2.7 | 2.6 | 2.8 | 2.6 | 2.8 | 2.7 |

| Example | 8 | 9 | 10 | 11 | 12 | 13 |
|---|---|---|---|---|---|---|
| Density (kg/m$^3$) | 24 | 21 | 23 | 21 | 23 | 21 |
| Tensile Strength (kg.wt./cm$^2$) | 1.0 | 1.2 | 1.0 | 1.1 | 1.0 | 1.1 |
| Elongation at Break (%) | 260 | 290 | 270 | 280 | 285 | 260 |
| Compression Strength 40% (p/cm$^2$) | 24 | 18 | 16 | 19 | 16 | 18 |
| Sag Factor | 2.9 | 2.7 | 2.8 | 2.6 | 2.8 | 2.7 |

EXAMPLES 14–23

100 parts by weight of the polyether used in Examples 1 to 13 are reacted with various hydrazine derivatives and the other components shown in the table in the ratios indicated to produce foams as described in Examples 1–13.

| Example | 14 | 15 | 16 | 17 | 18 | 19 |
|---|---|---|---|---|---|---|
| Polyether | 100 | 100 | 100 | 100 | 100 | 100 |
| Water | 4.0 | 3.2 | 3.2 | 4.0 | 3.2 | 4.0 |
| Catalyst 1[1] | 0.2 | 0.3 | 0.3 | 0.3 | 0.3 | 0.3 |
| Methyl Hydrazine | 0.3 | 0.5 | — | — | — | — |
| Phenyl Hydrazine | — | — | 1.0 | 1.5 | — | — |
| 2-Hydrazinoethanol | — | — | — | — | 0.3 | 1.0 |
| Tin-Dioctoate | 0.225 | 0.2 | 0.2 | 0.2 | 0.2 | 0.2 |
| Stabilizer[4] | 1.0 | 1.0 | 1.0 | 1.0 | 1.0 | 1.0 |
| TDI - 80[5] | 47.9 | 40.2 | 40.0 | 49.3 | 39.4 | 50.3 |
| NCO/OH Ratio[6] | 105 | 105 | 105 | 105 | 105 | 105 |
| Starting Time (Sec.) | 6–7 | 6 | 6–7 | 4 | 4 | 7 |
| Rising Time (Sec.) | 80 | 97 | 110 | 105 | 75 | 70 |
| Setting Time (Sec.) | 100 | 118 | 275 | 130 | 93 | 75 |

| Example | 20 | 21 | 22 | 23 |
|---|---|---|---|---|
| Polyether | 100 | 100 | 100 | 100 |
| Water | 3.2 | 3.2 | 3.2 | 2.0 |
| Catalyst 1[1] | 0.3 | 0.3 | 0.1 | 0.3 |
| Carbohydrazide | 0.5 | — | — | — |
| 4-Hydroxybutyric acid hydrazide | — | 0.5 | — | — |
| 6-Hydroxycaproic acid hydrazide | — | — | 0.2 | — |
| N,N'-Diisobutyl-hydrazine | — | — | — | 0.5 |
| Tin Dioctoate | 0.2 | 0.1 | — | 0.2 |
| Stabilizer[4] | 1.0 | 1.0 | 1.0 | 1.0 |
| TDI - 80[5] | 39.4 | 35.4 | 38.5 | 23.9 |
| NCO/OH Ratio[6] | 105 | 95 | 105 | 95 |
| Starting Time (Sec.) | 7 | 6–7 | 7 | 10 |
| Rising Time (Sec.) | 155 | 95 | 73 | 89 |
| Setting Time (Sec.) | 185 | 108 | 93 | 110 |

All the foams have sag factors above 2.5, tensile strengths above 1.0 kg.wt/cm$^2$ and elongations at break above 150%.

Any of the other poly(alkylene ether) polyols, organic polyisocyanates, catalysts, and other additives indicated as suitable herein may be used in the foregoing examples instead of or along with those described.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for making a highly elastic polyurethane foam which comprises reacting a poly(alkylene ether) polyol which contains at least two hydroxyl groups and has a molecular weight of at least about 1500, at least 10% by weight of the hydroxyl group being primary hydroxyl groups and, a hydrazine derivative and/or hydrazine adduct having the general formula:

$$R-NH-NH-R'. (H_2O)_n,$$

in which R and R'are identical or different and represent hydrogen or alkyl, cycloalkyl, aryl, aralkyl or acyl groups and $n = 0$ or 1, with an organic polyisocyanate containing distilled tolylene diisocyanate in the presence of a blowing agent, the reaction being carried out in the absence of polyether-polysiloxane blocked copolymer foam stabilizers and the resultant foam having a density of from about 18 to about 50 kg/m$^3$.

2. The process of claim 1 wherein the polyisocyanate is pure tolylene-2,4-diisocyanate or a mixture of tolylene 2,4-diisocyanate and tolylene-2,5-diisocyanate.

3. The process of claim 1 wherein the polyisocyanate consists essentially of mixtures of tolylene diisocyanate and aliphatic, cycloaliphatic or other aromatic isocyanates in which the quantity of the tolylene diiisocyanate is at least 50% by weight of the total quantity of isocyanates.

4. The process of claim 1 wherein the hydrazine derivatives and/or hydrazine adducts are used in quantities, based on the hydrazine group of between about 0.1 to about 0.8 parts by weight per 100 parts by weight of poly(alkylene ether) polyol.

5. An elastic low density polyurethane foam having a sag factor of above about 2.5, a tensile strength of above about 1 kg.wt./cm$^2$ and an elongation at break of above about 150%, said foam having been prepared by reacting a poly(alkylene ether) polyol having at least two hydroxyl groups and a molecular weight of at least about 1500, a compound having the formula

$$R - NH - NH - R'. (H_2O)_n$$

wherein R and R' are the same or different and are $C_1$–$C_{12}$ alkyl groups, $C_5$–$C_{14}$ cycloalkyl groups, $C_6$–$C_{14}$ aryl groups, $C_7$–$C_{20}$ aralkyl groups or $C_1$–$C_{12}$ acyl groups, n is zero or 1, with an organic polyisocyanate which contains at least 50% by weight of one or more of 2,4-tolylene diisocyanate and 2,6-tolylene diisocyanate isomers in a foamable reaction mixture containing a blowing agent.

6. The foam of claim 5 wherein the said foamable reaction mixture is free from a polyether-polysiloxane.

* * * * *